July 9, 1968　　　D. E. GRISWOLD ET AL　　　3,391,585
BORING SPINDLE
Filed Sept. 14, 1966　　　　　　　　　　　5 Sheets-Sheet 1
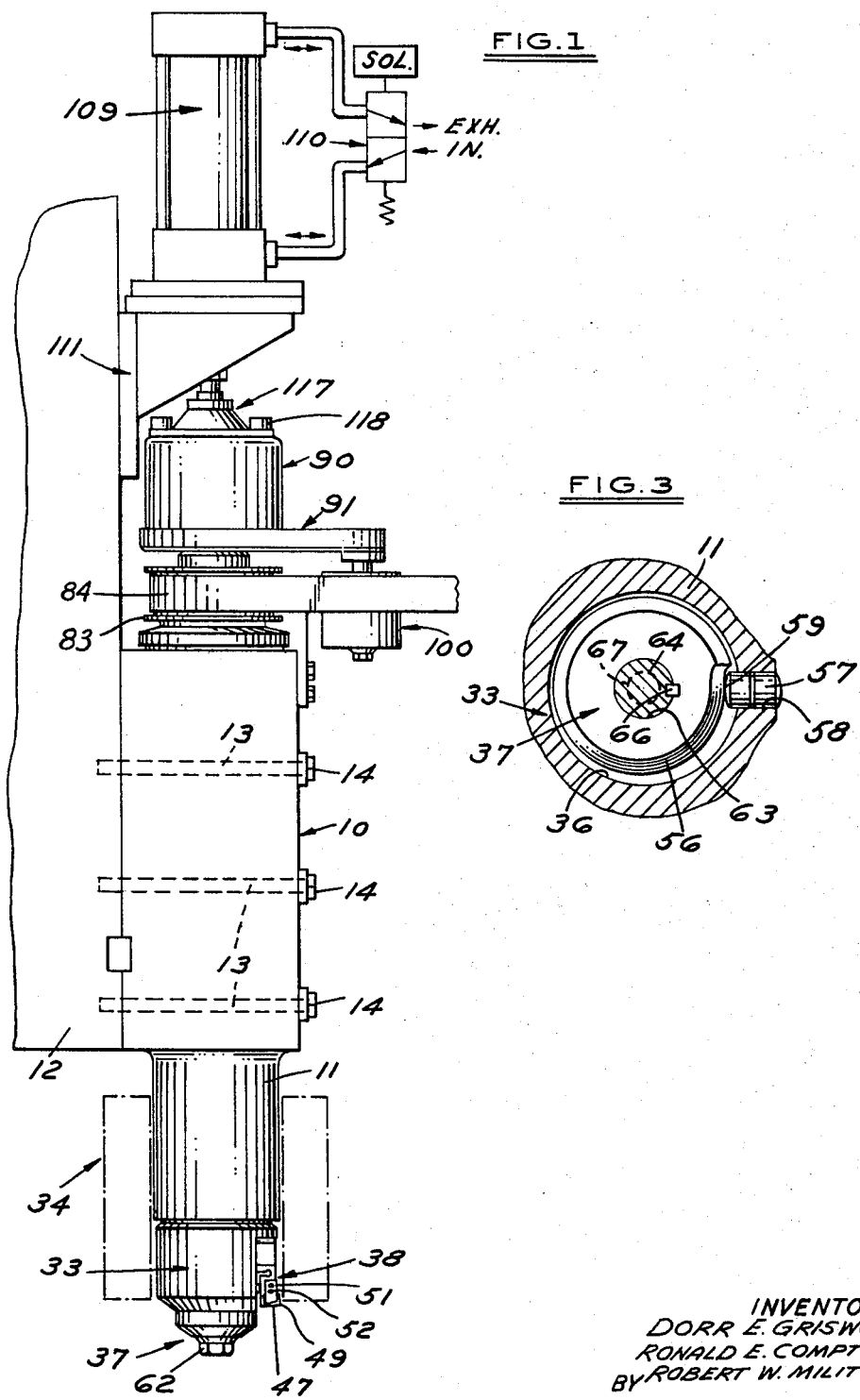
INVENTORS
DORR E. GRISWOLD
RONALD E. COMPTON
BY ROBERT W. MILITZER
James H. Bower
ATTORNEY

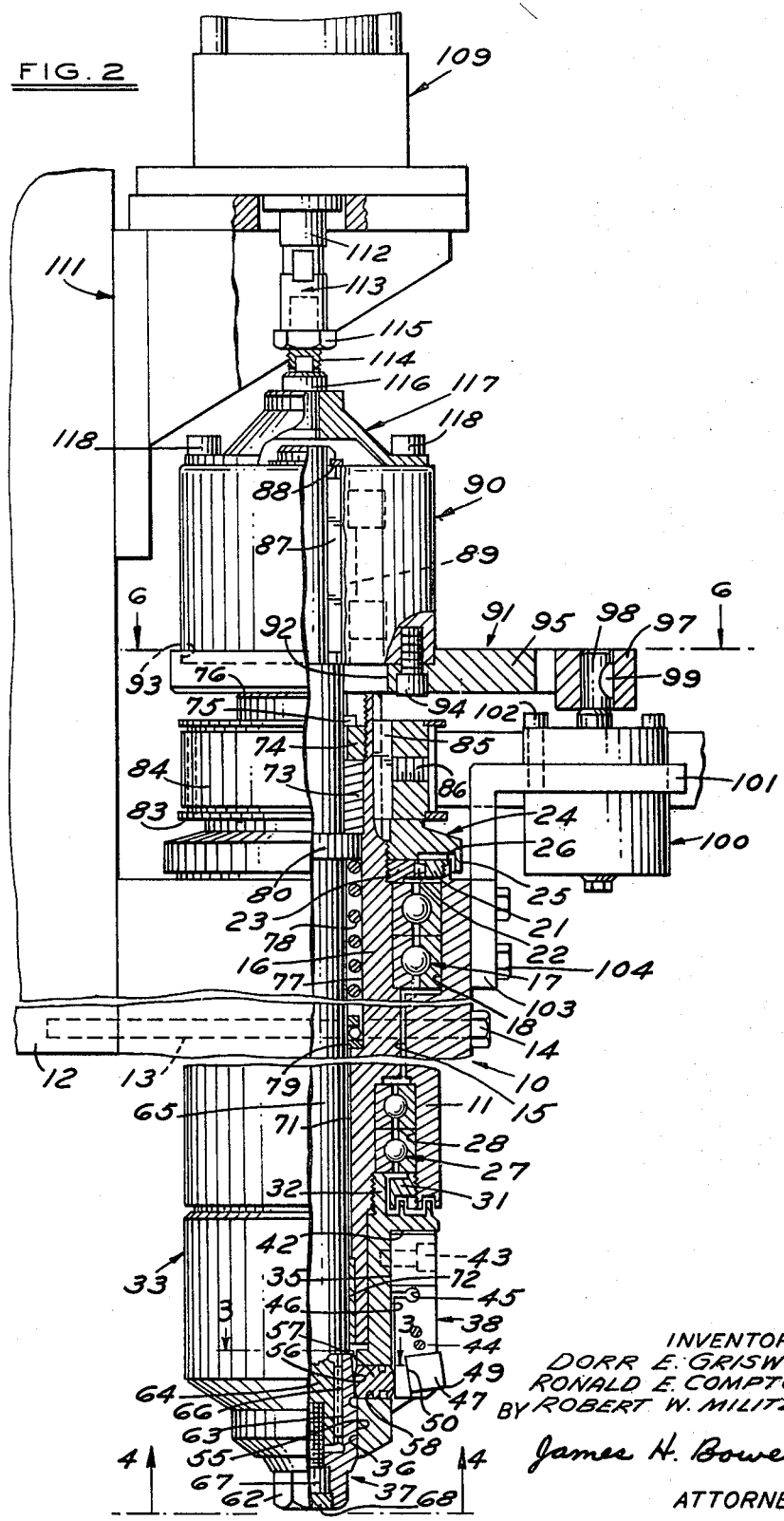

July 9, 1968 D. E. GRISWOLD ET AL 3,391,585
BORING SPINDLE
Filed Sept. 14, 1966 5 Sheets-Sheet 3

INVENTORS
DORR E. GRISWOLD
RONALD E. COMPTON
ROBERT W. MILITZER
BY James H. Bower
ATTORNEY

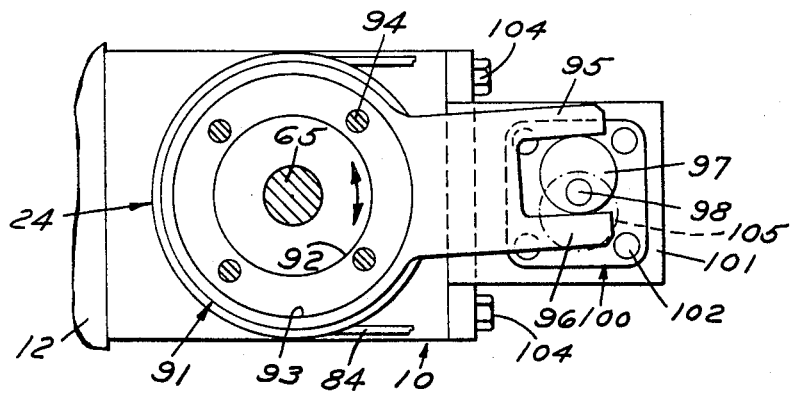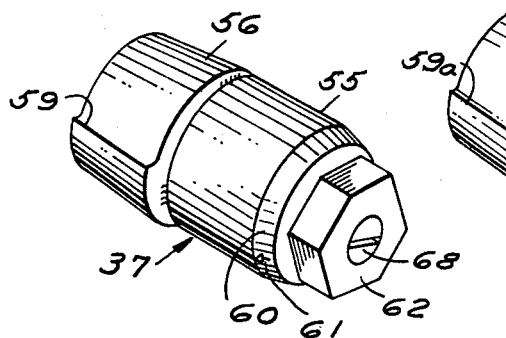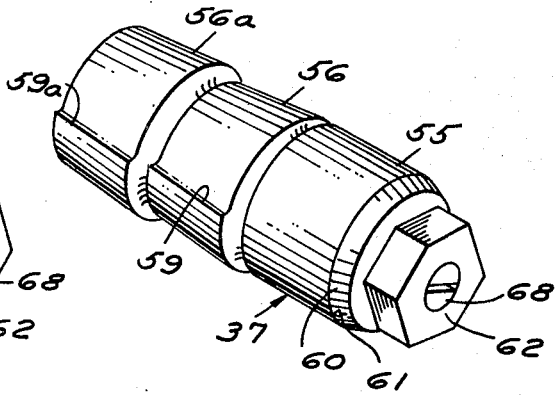

July 9, 1968   D. E. GRISWOLD ET AL   3,391,585
BORING SPINDLE
Filed Sept. 14, 1966   5 Sheets-Sheet 5
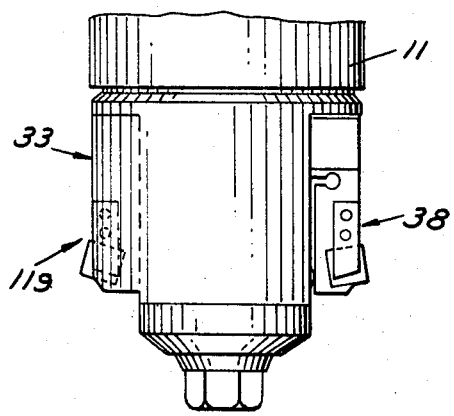
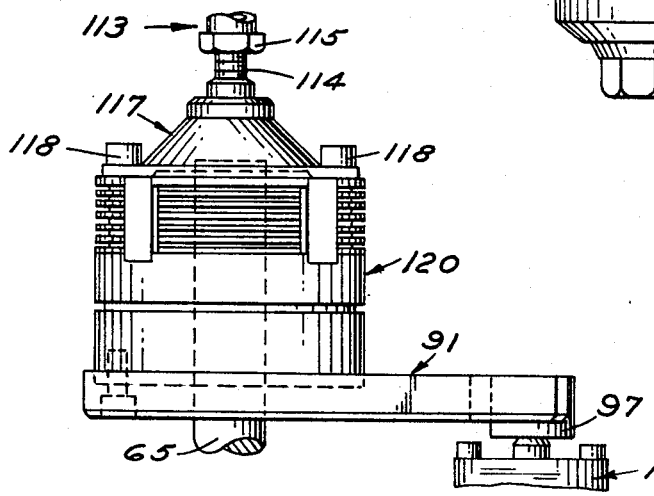
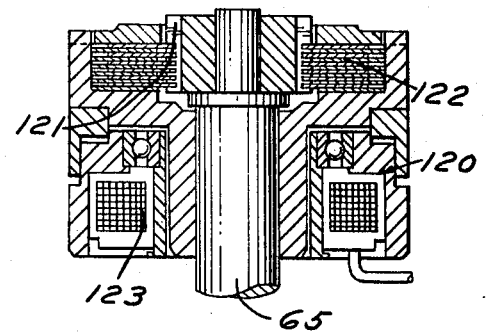
INVENTORS
DORR E. GRISWOLD
RONALD E. COMPTON
BY ROBERT W. MILITZER
James H. Bower
ATTORNEY

United States Patent Office 3,391,585
Patented July 9, 1968

3,391,585
BORING SPINDLE
Dorr E. Griswold, Detroit, Ronald E. Compton, Southfield, and Robert W. Militzer, Huntington Woods, Mich., assignors to Ex-Cell-O Corporation, Detroit, Mich.
Filed Sept. 14, 1966, Ser. No. 579,308
18 Claims. (Cl. 77—4)

This invention relates generally to the boring spindle art, and more particularly, to an improved boring spindle provided with size control tool wear compensating means and tool retraction means which can be operated either automatically or semi-automatically.

It is an important object of the present invention to provide a boring spindle for boring workpieces, such as cylinders and the like, which includes means to control the tool wear compensation and tool retraction for one or more single point tools, in either an automatic or semi-automatic manner, during a boring operation.

It is another object of the present invention to provide a novel and improved boring spindle which is provided with means for automatically or semi-automatically controlling the boring diameter size during a boring operation and which includes a barrel type cam located directly beneath a single point tool for deflecting the tool holding cartridge radially outward in predetermined increments for tool wear compensation. The barrel type cam is mounted on the front end of a draw bar for providing rotational and lateral or axial movement to the cam. The barrel cam is provided with a uniform, radial rise for achieving tool wear compensation as it is rotated incrementally, and it is also provided with a lateral or axial taper that allows the tool point to retract or feed out radially when the draw bar is moved axially a predetermined distance. An overrunning clutch or an electromagnetically operated clutch is operatively connected to the draw bar and functions to achieve the incremental rotational movement required by the barrel type cam for tool wear compensation. A clevis is mounted on the clutch and is moved through an arc by an eccentric cam powered by a suitable actuator which is operated when the spindle is in a stopped or braked condition. A linear actuator is connected to the draw bar to provide a lateral or axial motion to the barrel type cam for retraction of the tool, which is accomplished while the spindle is rotating. The use of an overrunning clutch provides for boring size control in one direction, and the use of an electromagnetically operated clutch provides for boring size control in either direction; that is, to control an increase or decrease of the bore size. The barrel type cam may be provided with a plurality of lobes and lateral tapers for controlling a plurality of tools.

It is a further object of the present invention to provide a novel and improved boring spindle which incorporates means for compensating for tool wear by a mechanism that includes an expansible tool actuated by a rotatable and axially movable cam means, and a single direction or dual direction driving clutch means.

It is still a further object of the present invention to provide a novel and improved boring spindle which includes a spindle housing, a spindle shaft rotatably mounted in the housing, an expansible tool means operatively mounted on one end of the spindle shaft, cam means carried on said shaft for adjusting said tool means for tool wear compensation and for retracting the tool means, and means for operating said cam means.

It is still another object of the present invention to provide a novel and improved boring spindle which is provided with tool retraction means, whereby the tool may be retracted for a fast travel into a bore and then advanced radially outward for a slow, backward boring operation. The tool retraction means is also adapted to permit a slow forward boring operation, followed by a retraction of the tool to allow for a fast rearward movement of the spindle from a workpiece. The tool retraction means may also be adapted to provide two cuts with a single tool so that the tool is cutting on both the forward and rearward movements of the spindle. The tool retraction means may also be adapted to operate to provide one cut with one tool when the spindle is moving into a workpiece, and a second cut with a second tool when the spindle is retracting from the workpiece.

Other objects, features and advantages of this invention will be apparent from the following detailed description, appended claims, and the accompanying drawings.

In the drawings:

FIG. 1 is a side elevational view of a boring spindle made in accordance with the principles of the present invention;

FIG. 2 is an enlarged, broken, side elevational view, with parts in section, of the boring spindle illustrated in FIG. 1;

FIG. 3 is a fragmentary, slightly enlarged, elevational section view of the structure illustrated in FIG. 2, taken along the line 3—3 thereof, and looking in the direction of the arrows;

FIG. 6 is an elevational section view, with parts removed, of the structure illustrated in FIG. 2, taken along the line 6—6 thereof, and looking in the direction of the arrows;

FIG. 7 is a perspective view of a barrel type cam employed in the structure of FIGS. 1 and 2;

FIG. 8 is a perspective view of a modified barrel type cam adapted for use in a boring spindle made in accordance with the principles of the present invention;

FIG. 9 is a fragmentary portion of a modified boring spindle made in accordance with the principles of the present invention, showing a spindle provided with two cutting tools;

FIG. 10 is a fragmentary, side elevational view of a modified boring spindle made in accordance with the principles of the present invention and which employs an electromagnetic clutch; and, FIG. 11 is a schematic cross section view of the electromagnetic clutch employed in the boring spindle shown in FIG. 10.

Figure 4:
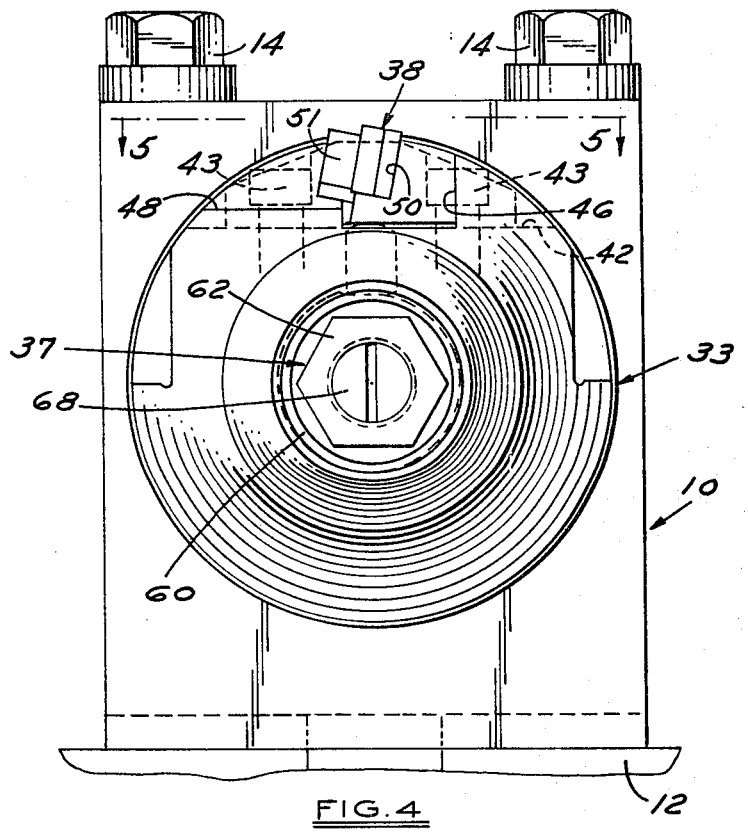
FIG. 4 is a front elevational view of the boring spindle illustrated in FIG. 2, taken along the line 4—4 thereof, and looking in the direction of the arrows.

Referring now to the drawings, and in particular to FIGS. 1 and 2, wherein is shown an illustrative embodiment of the invention, the numeral 10 generally designates an elongated boring spindle housing which is provided with an axially extended, cylindrical extension or neck 11 on the front end thereof. The boring spindle housing 10 is adapted to be secured to a machine base or other supporting member indicated by the numeral 12, by any suitable means, as by the bolts 13 and nuts 14.

As shown in FIG. 2, the spindle housing 10 is provided with an axial stepped bore 15 in which is rotatably mounted a mating tubular spindle shaft 16 which has a stepped outer surface that conforms to the stepped axial housing bore 15. The rear end of the spindle shaft 16 is rotatably supported in the spindle housing 10 by any suitable bearing means, as by the ball bearing means generally indicated by the numeral 17, which is seated in the radial recess 18. As shown in FIG. 2, the radial recess 18 is located at the rear end of the spindle housing 10 and the outer end thereof is partially enclosed by a threadably mounted ring or annular seal retainer member 21 which carries around the inner periphery thereof a suitable ring seal 22. The seal 22 is adapted to sealingly engage the outer periphery of a bearing retainer ring 23 which is threadably mounted on the spindle shaft 16, and which is adapted to engage the inner race of the bearing means 17 and retain it in place on the spindle shaft 16. The spindle shaft 16 is further provided with a rear end cover ring, generally indicated by the numeral 24, and which is provided with an axially extended flange 25 that overlies the annular short cylindrical extension 26 on the rear end of the spindle housing 10.

As shown in FIG. 2, the front end of the spindle shaft 16 is rotatably mounted in the spindle housing 10 by any suitable bearing means, as by the ball bearing means generally indicated by the numeral 27. Bearing means 27 is operatively disposed in a radial recess 28 which is formed at the front end of the housing stepped bore 15. The outer race of the bearing means 27 is retained in place in the recess 28 by a threadably mounted retainer ring 31. The inner race of the bearing means 27 is operatively retained on the spindle shaft 16 by means of the rearward extended cylindrical extension 32 which is integrally formed on the rear end of a tool head generally indicated by the numeral 33. As shown in FIG. 1, the spindle housing extension 11 and the tool head 33 are each made to a predetermined size to permit these members to move into a bore which is to be finished in a workpiece, as indicated generally by the numeral 34.

As shown in FIG. 2, the tool head 33 is cylindrical in outer configuration, and it is provided with a stepped axial bore, including the inner bore portion 35 and the outer reduced bore portion 36. The inner bore portion 35 slidably receives the front end of the spindle shaft 16. The reduced outer bore portion 36 is adapted to rotatably receive and seat a tool-operating cam means generally indicated by the numeral 37. The cam means 37 is adapted to adjust an expansible tool means 38 radially outward. The cam means 37 is also adapted to retract the tool means 38.

Figure 5:
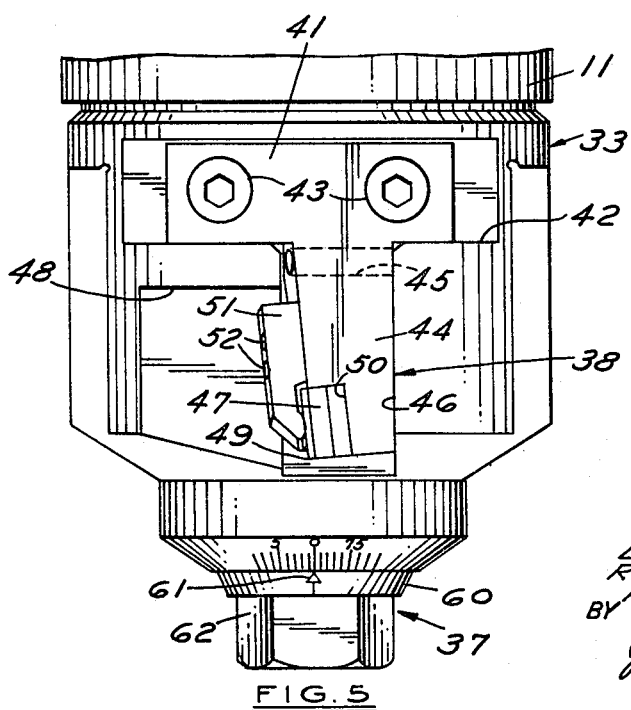
FIG. 5 is a fragmentary, top view of the structure illustrated in FIG. 4, taken along the line 5—5 thereof, and looking in the direction of the arrows.

As shown in FIG. 5, the expansible tool means 38 includes a tool holder having a T-head 41 which is seated in a transverse recess 42 formed on the outer surface of the tool head 33. The tool holder portion 41 is releasably secured in the recess 42 by a suitable means, as by the screws 43. A tool carrier or arm 44 is integrally connected to the T-head 41, and it is provided with a transverse opening 45 on the lower side thereof, at the junction point with the T-head 41, to permit the arm 44 to be flexed radially outward from the tool head 33.

The arm 44 is adapted to carry a cutting tool 47, as for example, a ceramic tool bit. The arm 44 is disposed in a longitudinal recess 46 that is formed in the outer surface of the tool head 33. The recess 46 communicates with the transverse recess 42. The tool head 33 is cut away on one side thereof, as indicated by the numeral 48, to provide clearance for the cutting tool arm 44 and its associated tool-holding structure. As shown in FIG. 5, the tool 47 is held in a recess 50 formed in an outer corner of the arm 44, and it is retained in place by a retainer member 51 which is secured to the arm 44 by the screws 52. The cutting point on the cutting tool 47 is indicated by the numeral 49.

As shown in FIGS. 2 and 7, the cam means 37 comprises an elongated, substantially cylindrical, body which is provided on the outer end thereof with a bearing diameter 55 that is adapted to be rotatably and slidably mounted in the tool head outer bore portion 36. A cam lobe 56 is formed on the inner end of the cam body and it is adapted to engage the rounded inner end of a cam pin 57 which is slidably mounted in a radial hole 58 (FIG. 3). As shown in FIG. 2, the outer end of the cam pin 57 is rounded and it engages the underside of the tool carrier or tool arm 44 at a position behind the cutting tool 47.

As shown in FIG. 3, the cam lobe 56 is provided with a peripheral or transverse cam shape, and a longitudinal or lateral cam shape. The cam lobe 56 tapers from its outer end toward its inner end, whereby when the cam lobe 56 is in the position shown in FIG. 2, the cam pin 57 is moved outwardly to move the tool 47 radially outward. When the cam 37 is moved axially forward, or down as shown in FIG. 2, the cam pin 57 will be moved radially inward because of the tapered surface of the cam lobe 56 and the pressure of the expansible tool means 38. The lateral taper on the cam lobe 56 is formed in accordance with any desired amount of tool retraction. In one embodiment, the lateral taper on the cam lobe 56 was 0.0015" per .25" of length of the cam lobe 56. The boring diameter decreased .003" with such a lateral taper during a retraction operation.

The cam lobe 56 is also provided with a predetermined rise in a predetermined number of degrees for tool wear compensation. For example, in one embodiment of the invention, the cam lobe 56 was provided with a .006" raise in 345.6° around the periphery of the lobe 56, and 14.4° was reserved for cam resetting rotation. In said embodiment, each tool compensation movement of the cam lobe 56 increased the boring diameter .00025". A total of 48 compensations is available under such conditions, as more fully described hereinafter.

The numeral 59 in FIGS. 3 and 7 indicates the "zero" position of the rise portion of the cam lobe 56. As shown in FIG. 7, the outer end of the cam 37 is provided with a circular, sloping face 60 on which is disposed a zero indicator 61 to indicate when the cam 37 is turned to the zero or start position. As shown in FIG. 5, the adjacent end face of the tool head 33 is provided with indicia marks along the path of movement of zero indicator 61 for indicating the adjusted position of the cam 37 relative to the tool head 33. The cam 37 includes an integral adjusting knob 62 on the outer end thereof for manual adjustment of the tool 47 for reset purposes.

As shown in FIG. 2, the cam 37 is provided with a bore 63 in its rear or inner end in which is received the front, reduced end 64 of a draw bar 65 that is formed as an elongated cylindrical rod. The draw bar 65 is secured to the cam 37 by the key 66 and the screw 67. The screw 67 is locked in place by the lock plate 68.

As shown in FIG. 2, the spindle 16 is provided with an axial bore 71 in which is journaled the draw bar 65. The front end of the draw bar 65 is supported by the sleeve bearing 72, and the rear end thereof is supported by the sleeve bearing 73. The sleeve bearing 73 is retained in place by the lock ring 74 which is threadably mounted in the rear end of the spindle shaft 16. The lock ring 74 is secured in place by the snap ring 75. The numeral 76 indicates the rear end of the spindle shaft 16.

As shown in FIG. 2, the draw bar 65 is normally maintained in position to move the cam 37 to its tool advancing position. A return spring 78 is mounted in a concentric position about the draw bar 65 in the annular recess 77. The front end of the return spring 78 abuts the thrust bearing 79, and the rear end of the return spring 78 abuts the stop shoulder or collar 80 which is integrally formed on the draw bar 65.

As best seen in FIG. 2, the spindle shaft 16 is driven by a pulley 83 which is rotated by a drive belt 84 from a suitable power source. The pulley 83 is secured to the spindle shaft 16 by the key 85 and the setscrew 86. Although the invention has been illustrated in a rotating tool spindle embodiment, it will be understood that the invention may also be employed in stationary tool spindles operating on workpieces which rotate.

The means for rotating the draw bar 65 is illustrated in FIGS. 2 and 6. As shown in FIG. 2, the rear end of the draw bar 65 is connected by the key 87 and the retainer snap ring 88 to the clutch inner member or race 89 of an overrunning clutch generally indicated by the numeral 90. The clutch 90 is a single direction, driving clutch which overruns in the opposite direction. Any suitable clutch may be used, as for example, a model FSO–400 clutch sold by the Formsprag Company of Warren, Mich.

A clevis, generally indicated by the numeral 91 in FIG. 2, is connected to the outer member of the clutch 90 for operating the clutch. As shown in FIG. 2, the clevis 91 includes a lower portion through which is formed a hole 92 for the passage therethrough of the draw bar 65. The clevis 91 is provided with an annular recess 93 on the rear side thereof in which is seated the outer member of the clutch 90 that is secured to the clevis by a plurality of screws 94.

As shown in FIG. 6, the clevis 91 is provided with a pair of spaced apart arms 95 and 96 between which is operatively mounted an eccentric cam 97. The cam 97 is secured by the key 99 (FIG. 7) to the driveshaft 98 of a suitable oscillating rotary actuator 100. The rotary actuator 100 is secured to the bracket arm 101 of an L-shaped bracket by the screws 102. The bracket arm 101 is integrally connected to the bracket portion 103 which is connected to the spindle housing 10 by the screws 104. The solid line position of the cam 97 in FIG. 7 indicates the position to which the cam is rotated by the rotary actuator 100 to unlock the clutch. The broken line position 105 of the cam 97 illustrates the position of the cam 97 at the end of a tool wear compensation rotary movement of the draw bar 65. The rotary actuator is adapted to rotate 90° in each direction from an initial starting position. It will be understood, that any suitable rotary actuator may be used, as for example, a rotary actuator available on the market from the Ex-Cell-O Corporation of Detroit, Mich., under model No. S–125.

The numeral 109 in FIGS. 1 and 2 generally designates a linear actuator for actuating the draw bar 65 against the force of the draw bar spring 78. The linear actuator 109 may be any suitable fluid cylinder, as for example, a pneumatic cylinder. The cylinder 109 may be controlled by any suitable means, as for example, a two-position three-way valve generally indicated by the numeral 110 in FIG. 1. The valve 110 may be operated by any suitable means, as for example, an electric solenoid in one direction and a return spring in the other direction.

As shown in FIG. 2, the fluid cylinder 109 is supported by a suitable bracket 111 in a position so as to axially align the cylinder rod 112 with the draw bar 65. The cylinder rod 112 carries a suitable connection means 113 in which is threadably mounted an abutment rod 114. The rod 114 is threadably mounted in the connection means 113 in an adjusted position by a lock nut 115. The abutment rod 114 is adapted to engage the abutment 116 carried on the bracket 117 which is secured to the rear end of the clutch 90 by the screws 118.

The boring spindle of the present invention may be used for various machining cuts. For example, the spindle structure shown in FIG. 1 with one tool may be used to make a slow forward cut when the spindle is making a forward stroke and a fast return during a return stroke of the spindle. In such a case the cam 37 is in the position shown in FIG. 2 so as to move the cutting tool 47 outwardly for the cut on the slow forward stroke. Before the fast return stroke, the fluid cylinder 109 would be operated to move the cam 37 forwardly, or down as viewed in FIG. 2, to release the tool 47 for the non-cutting return stroke. If it is desirable to utilize the return stroke of the spindle for a boring "out" operation, the tool retract mechanism can serve to increase the boring diameter before feeding the tool 47 out of the bore. This is accomplished by reversing the operation of the retract mechanism, that is, during the forward stroke of the spindle, the cam 37 would be moved forwardly so that pin 57 would ride on the lower portion of the tapered part 56 of the cam. During the return stroke, the cam 37 would be moved to the position shown in FIG. 2 for the boring-out operation. That is, with a single tool, the boring spindle can bore or cut "in" with a rough cut, then with the tool fed out, or on the higher portion of the cam 37, the spindle can bore back or "out" for a finish cut. The tool 47 could also be set up so that the cam 37 releases the tool 47 when the spindle is moved into the workpiece with a rapid forward stroke, after which the spindle may be retracted with a slow cutting speed with the tool 47 advanced radially outward by the cam 37, to the position shown in FIG. 2 for a boring-out operation. In the last mentioned case, there would be no cutting operation on the last forward stroke of the spindle.

It will be seen that tool retraction is accomplished while the spindle continues to rotate with the outer race of the clutch 90 being held stationary. It will also be seen that when the pressure within the fluid cylinder 109 is relieved, the return spring 78 returns the draw rod 65 upward, as viewed in FIG. 2, against the stop shoulder 80, to thus reposition the tool 47.

It will be seen that the boring diameter size control is accomplished by the barrel type cam 37. The cam 37 with its uniform radial rise permits adjustment of the tool for tool wear compensation as the cam is rotated incrementally. The overrunning clutch 90 serves to achieve the incremental motion required by the cam 37 for tool wear compensation. The clevis 91 which is moved through an arc by means of the eccentric cam 97 causes a 7.2° radial advance of the barrel cam 37 after the spindle rotation has been stopped and held in place by means of a suitable brake located in the drive train of the machine tool carrying the spindle.

In a semi-automatic control system for controlling the boring diameter size control, the rotary actuator 100 would be operated by manual push buttons to achieve the tool compensation effect. A separate gauging means would be employed to check the bore of the workpiece which is being machined to determine when and where the tool compensation is required. Each compensation movement of the cam increases the bored diameter .003" with 48 possible increments of compensation available. Two additional increments are required to turn the tool 47 to the "start" position by means of the manual adjustment knob 62, thus making a total of 50 increments per revolution of the compensating cam 37. It will be understood that the initial tool setting would be accomplished by a suitable hand gauge which would be placed on gauging surfaces located on the tool head 33. The compensating cam 37 would then be rotated manually from the "stop" position to the desired bore diameter as dictated by the gauge setting. After the tool has been brought to size, the number of tool compensations may be monitored by any suitable counting means to determine when the tool should be replaced.

The tool wear compensation operation may be carried out automatically by the use of a suitable automatic gauging system which would sense a high and low limit with respect to a given diameter. Whenever these limits are exceeded, the machine will automatically stop. The automatic gauging system would also initiate actuation of the rotary actuator 100 for tool wear compensation movements as sensed by the gauging system.

It will be understood that the two-position three-way valve 110 for operating the fluid cylinder 109 would be actuated by the control system of the machine tool on which the spindle is mounted so as to advance and retract the tool 37 in accordance with the overall machining program being carried out by the machine.

FIG. 8 illustrates a modified cam 37 for use in a multiple tool boring spindle. As shown in FIG. 8, the second cam surface 56a with an initial or zero position 59a is integrally attached to the inner end of the cam 37 for controlling a second tool 47 carried on the tool head 33. The tools adapted to be adjusted by the cam shown in FIG. 8 would be initially set at different positions so that one tool would extend outwardly beyond the other tool. However, both tools would be moved outward in a simultaneous manner when the cam with the multiple lobes is rotated for tool wear compensation in the same manner as described in the embodiment of FIG. 7.

FIG. 9 illustrates the mounting of a second tool 119 in a fixed position on the tool head 33. The addition of the second tool 119 will permit the spindle to make a rough cut with the tool 119 when the spindle is making a forward stroke into the workpiece and a finish cut with the expansible tool 38 when the spindle is moved through the return stroke. The roughing tool 119 is set a slight distance ahead of the point of the cutting tool 38, as for example, 1/16" ahead or downward as viewed in FIG. 2. During a forward stroke of the spindle, the tool 38 would be retracted and it would be advanced radially outward for the finish cut. The tool 119 may be any suitable tool, as for example, a ceramic tool.

FIGS. 10 and 11 illustrate a modified type of clutch which permits the spindle to be utilized for automatic size control in either direction. That is, for increasing or decreasing the bore size. The numeral 120 generally designates a suitable electromagnetic clutch for rotating the draw bar 65 in either direction for increasing or decreasing the bore size. As shown in FIG. 11, the draw bar 65 would be connected to the clutch driven gear 121. When the coil 123 of the magnetic clutch is energized, the clutch plates 122 will be actuated to lock the driven gear 121 to the outer portion of the clutch 120 which is connected to the clevis 91 in the same manner as the overrunning clutch 90 in the embodiment of FIGS. 1 and 2. It will be seen that when the electromagnetic clutch 120 is energized, the rotary actuator 100 may be employed to rotate the draw bar 65 in either direction since the draw bar 65 is locked to the clevis 91. Any suitable electromagnetic clutch may be employed, as for example, the electromagnetic clutch model No. SC 225 made by the Fawick Airflex Division of Fawick Corporation of Cleveland, Ohio. It will be understood that the actuation of the rotary actuator when the electromagnetic clutch 120 is employed would be carried out by an automatic gauging system which would direct the actuator 100 to increase or decrease the bore size, as required.

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claims.

What is claimed is:

1. In a tool spindle for machining a bore in a workpiece, the combination, comprising:
   (a) a spindle housing;
   (b) a spindle shaft mounted in said housing;
   (c) an expansible tool means operatively mounted on said spindle shaft;
   (d) cam means carried by said shaft for adjusting said tool means for controlling the size of the bore and for radially advancing and retracting the tool means; and,
   (e) means for operating said cam means.

2. A tool spindle structure as defined in claim 1, including:
   (a) means for rotating said spindle shaft.

3. A tool spindle structure as defined in claim 1, wherein:
   (a) said cam means is disposed in said spindle shaft behind the tool means for controlling the radial inward and outward adjustments of the tool means to control the size of a bore being machined.

4. A tool spindle structure as defined in claim 3, wherein:
   (a) said cam means comprises a barrel type cam provided with at least one radial rise about its periphery for controlling the size of a bore being machined, and at least one lateral taper for controlling the radial advancing and retracting movements of the tool means.

5. A tool spindle structure as defined in claim 3, wherein:
   (a) said tool means comprises a plurality of tool members; and,
   (b) said cam means comprises a barrel type cam provided with a plurality of radial rises about its periphery for controlling a plurality of tool members to control the size of a bore being machined, and a plurality of lateral tapers for controlling the radial advancing and retracting movements of said plurality of tool members.

6. A tool spindle structure as defined in claim 4, wherein:
   (a) said means for operating said cam means includes means for rotating said barrel type cam in both directions for increasing and decreasing the size of the bore being machined.

7. A tool spindle structure as defined in claim 4, wherein, said means for operating said cam means includes:
   (a) an electromagnetically operated clutch operatively connected to said barrel type cam for rotation of said barrel type cam in both directions for increasing and decreasing the size of the bore being machined; and,
   (b) actuator means for rotating said electromagnetically operated clutch.

8. A tool spindle structure as defined in claim 4, wherein, said means for operating said cam means includes:
   (a) an overrunning, one direction clutch operatively connected to said barrel type cam for rotation of said barrel type cam in one direction for tool wear compensation to maintain control over the size of the bore being machined; and,
   (b) actuator means for rotating said overrunning clutch in said one direction.

9. A tool spindle structure as defined in claim 1, including:
   (a) a second tool means fixedly mounted on said spindle shaft.

10. In a tool spindle for machining a bore in a workpiece, the combination, comprising:
    (a) a spindle housing;
    (b) a tubular spindle shaft mounted in said housing;
    (c) an expansible tool means operatively mounted on said spindle shaft for radial inward and outward movements;
    (d) a draw bar movably mounted in said tubular spindle shaft;
    (e) a rotatable and axially movable barrel type cam mounted on said draw bar in a position behind the tool means for controlling the radial inward and outward adjustments of the tool means to control the size of a bore being machined, and for controlling the radial advancing and retracting movements of the tool means;
    (f) means for rotating said draw bar for rotating said barrel type for size control adjustments; and,
    (g) means for linearly moving said draw bar to move said barrel type cam axially for advancing and retracting movements of the tool means.

11. A tool spindle structure as defined in claim 10, wherein:
    (a) said barrel type cam is provided with at least one radial rise about its periphery for controlling the size of a bore being machined, and at least one lateral taper for controlling the radial advancing and retracting movements of the tool means.

12. A tool spindle structure as defined in claim 10, wherein:
    (a) said barrel type cam is provided with means for manually adjusting the cam.

13. A tool spindle structure as defined in claim 10, wherein, said means for rotating said draw bar comprises:

(a) clutch means connected to said draw bar; and,
(b) actuator means for operating said clutch means for rotating said draw bar.

14. A tool spindle structure as defined in claim 13, wherein:
(a) said clutch means comprises a one direction overrunning clutch.

15. A tool spindle structure as defined in claim 13, wherein:
(a) said clutch means comprises a electromagnetically operated clutch.

16. A tool spindle structure as defined in claim 13, wherein, said actuator means for operating said clutch means comprises:
(a) a rotary actuator operatively connected to said clutch means.

17. A tool spindle structure as defined in claim 16, wherein, said rotary actuator is connected to said clutch means by:
(a) a clevis connected to the clutch means and movable through an arc by an eccentric cam rotated by said rotary actuator.

18. A tool spindle structure as defined in claim 10, wherein:
(a) said means for linearly moving said draw bar comprises a fluid cylinder.

References Cited

UNITED STATES PATENTS

| | | | |
|---|---|---|---|
| 2,990,730 | 7/1961 | Pougnand | 77—4 |
| 3,094,014 | 6/1963 | Bartolat | 77—58 |
| 3,276,101 | 10/1966 | Plein | 77—58 |

GERALD A. DOST, *Primary Examiner.*